Oct. 24, 1944.   W. G. KÖGEL   2,360,834
ABSORPTION REFRIGERATING APPARATUS
Filed Feb. 10, 1943
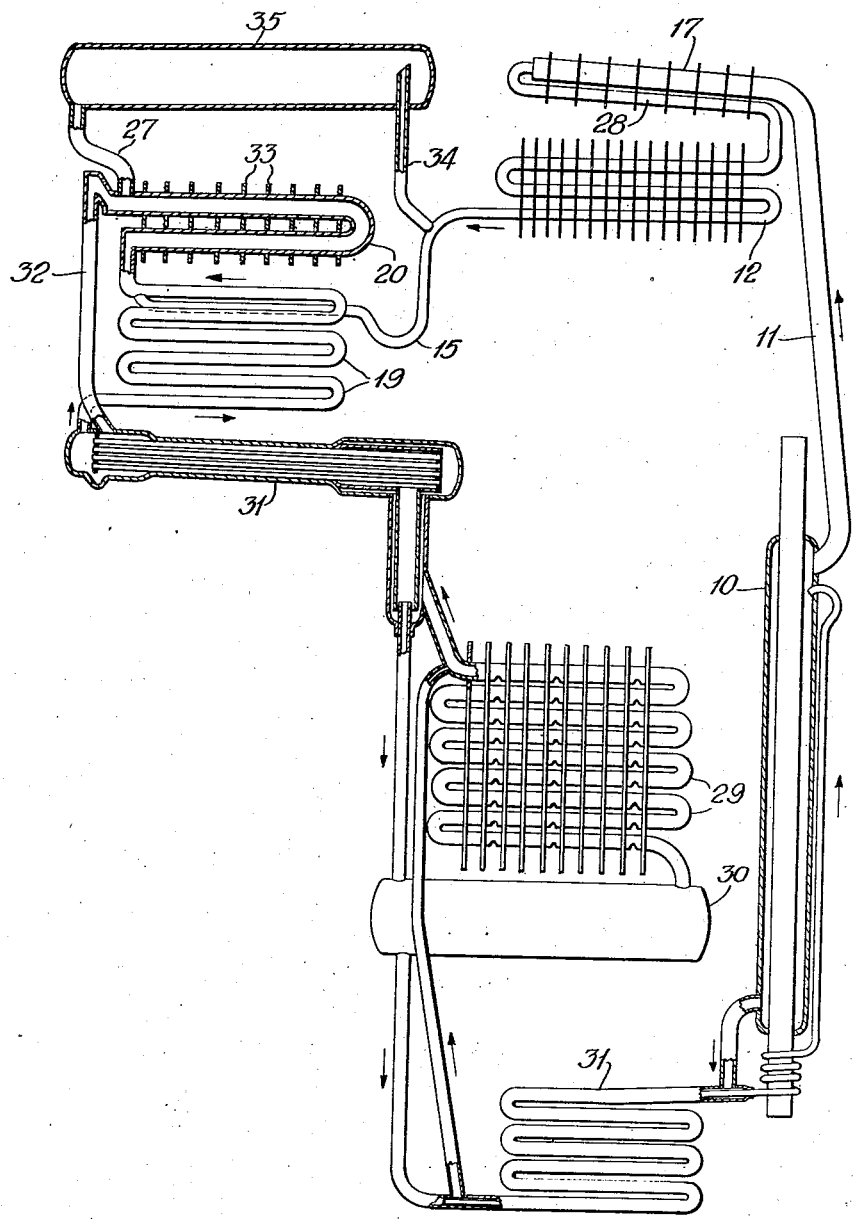
INVENTOR
Wilhelm Georg Kögel
BY
D. E. Heath
his ATTORNEY Patented Oct. 24, 1944

2,360,834

UNITED STATES PATENT OFFICE 2,360,834

ABSORPTION REFRIGERATING APPARATUS

Wilhelm Georg Kögel, Stockholm, Sweden

Application February 10, 1943, Serial No. 475,333
In Sweden January 26, 1942

5 Claims. (Cl. 62—119.5)

The present invention relates to absorption refrigerating apparatus with a pressure-equalizing gas, two or more tapping conduits from the refrigerant condenser to the evaporator and an additional condenser which becomes active only at high temperatures of the cooling air and which is connected, on the one hand, by a vapour conduit with the main condenser and, on the other hand, by a gas conduit with the auxiliary gas system, said additional condenser containing in normal cases auxiliary gas. As such an additional condenser use may be made of the so-called pressure vessel containing in normal cases the auxiliary gas which, at increasing temperatures of the refrigerant, is pressed by boiler vapours into the gas circulation where it increases the total pressure.

In apparatus of this kind the gas conduit is introduced into the additional condenser at the end opposite the mouth of the vapour conduit in the additional condenser, and the other mouth of the conduit is introduced into the gas circulation, generally into the gas heat exchanger. The condensate precipitated in the auxiliary condenser was previously either withdrawn from the end opposite the mouth of the vapour conduit through a special draining conduit, or it was allowed to run back through the vapour conduit itself. If it was desired to supply the condensate to the evaporator for generating useful cold, it was necessary in both cases to arrange a U-seal in the special draining conduit or the branch conduit from the vapour tube, respectively, in fr nt of the entry of the draining conduit into the evaporator for the purpose of preventing boiler vapours from entering in the condensed state into the evaporator.

If, however, the apparatus is stated for the first time or after a transport at a low cooling air temperature, said U-seal is not yet filled with liquid. As all boiler vapours condense in the main condenser, no boiler vapours can enter the evaporator; the open connection may, however, give rise to a gas circulation between the evaporator, auxiliary condenser and gas heat exchanger, thereby retarding or impeding the first starting of the apparatus.

The invention designs to increase the reliability of apparatus of this kind, more particularly during starting, and consists substantially in that the gas conduit of the additional condenser is formed as a permanently open conduit at the same time serving as a drain pipe draining into the evaporator. This not only increases the reliability of the apparatus, but also effects a saving in conduits, when the apparatus is built up, because the hitherto usual, other draining conduit or the branch conduit with its U-seal, respectively, is dispensed with, and on the other hand, when the parts are suitably arranged, the conduit leading from the pressure vessel to the evaporator may be shorter than the conduit leading to the gas heat exchanger.

The invention will be more fully described with reference to the accompanying figure from which also other characteristics of the invention will be seen.

The embodiment shows an absorption refrigerating apparatus operating with water, ammonia and hydrogen. The working of these apparatus is known in all essentials. The vapour expelled in the boiler 10 rises through the rising pipe 11 and the separator 17 to the precondenser 28 and passes from there to the main condenser 12. The condensate formed therein is supplied through the conduit 15 to the ice-producing evaporator 19 in which it vaporises into the circulating auxiliary gas. In the embodiment, the auxiliary gas circulates in countercurrent in the ice-producer 19 to the condensate by way of the space cooler 20 and the conduit 32 to the gas heat exchanger 31, from there through the descending conduit to the absorber collector 30 and rises from here through the absorber coil 29 in which the auxiliary gas is washed out, whereupon it returns to the evaporator 19 by way of the gas heat exchanger. The circulation of the absorbent between the boiler and absorber takes place in known manner by way of the liquid heat exchanger.

According to the invention the vapour conduit 34 is connected to the end of the main condenser 12, said conduit opening on the right side in the figure into the pressure vessel 35 serving as an additional condenser. The gas conduit 27 branches off from the opposite side of the pressure vessel and is directly introduced into the evaporator 20 provided with cooling fins 33. The gas conduit 27 has such a large diameter that gas and condensate may pass through it without impeding each other. The pressure vessel 35 serving as an additional condenser is inclined in a corresponding manner, so that condensate formed therein drains into the evaporator through the permanently open gas conduit 27.

At a low space cooling temperature all boiler vapours are condensed in the main condenser 12, and run towards the ice-producer 19. At a low cooling air temperature also the heat radiation into the refrigerator cabinet is low, the cold given off by the ice-producer 19 sufficing for keeping the cooling space air cold. If, however, the space cooling temperature is high, boiler vapours will enter through the vapour conduit 34 into the pressure vessel 35, the auxiliary gas content of which is pressed by them into the evaporator by way of the gas conduit 27. The condensate forming in the pressure vessel 35 serving as an additional condenser runs through the gas conduit 27 into the space cooler 20 which is now started. This is desirable, because also the heat radiation into the cabinet will be greater at high cooling air temperatures, so that a better cooling of the air of the refrigerator cabinet will be necessary.

The embodiment shows that a special draining conduit for the additional condenser is dispensed with, and that an unintentional circulation of the auxiliary gas through the evaporator is not possible in spite of the two condensate tapping conduits 15 and 27, because the tapping conduit 15 instantly receives a liquid seal from the main condenser 12, when the apparatus is started.

The invention is not limited to the embodiment shown. Particularly the additional condenser may consist of a tubular coil instead of the pressure vessel shown. The volume of this tubular coil is preferably made 40–70 times as large as the normal condenser, thus ensuring a sufficient storage of auxiliary gas therein.

What I claim is:

1. An absorption refrigeration system comprising a plurality of elements interconnected to provide a closed circuit for the circulation of a refrigerant, absorption solution and an auxiliary pressure balancing gas, said system including a condenser, a pressure vessel, an evaporator, a conduit connecting the condenser and evaporator, a second conduit connecting the condenser and pressure vessel, means connected to the evaporator for providing a path of flow for the auxiliary pressure balancing gas therethrough, and a conduit connecting the evaporator to the pressure vessel to provide a path of flow for the auxiliary pressure balancing gas to and from the pressure vessel and a path of flow for liquid refrigerant draining from the pressure vessel.

2. An absorption refrigeration system comprising a plurality of elements interconnected to provide a closed circuit for the circulation of refrigerant, absorption solution and an auxiliary pressure balancing gas, said system including a main condenser, an auxiliary condenser arranged with one end higher than its opposite end, an evaporator, a conduit connecting the main condenser and evaporator, a second conduit connecting the main condenser and higher end of the auxiliary condenser, means connected to the evaporator for providing a path of flow for the auxiliary pressure balancing gas therethrough, and a conduit connecting the evaporator to the lower end of the auxiliary condenser to provide a path of flow for the auxiliary pressure balancing gas to and from the auxiliary condenser and a path of flow for liquid refrigerant draining from the auxiliary condenser.

3. An absorption refrigeration system comprising a plurality of elements interconnected to provide a closed circuit for the circulation of a refrigerant, absorption solution and an auxiliary pressure balancing gas, said system including a main condenser, a pressure vessel constituting an auxiliary condenser arranged with one end higher than its opposite end, and an evaporator having high and low sections, a conduit connecting the main condenser and low section of the evaporator, a second conduit connecting the main condenser and higher end of the pressure vessel, means connected to the evaporator for providing a path of flow for the auxiliary pressure balancing gas therethrough, and a conduit connecting the high section of the evaporator to the lower end of the pressure vessel to provide a path of flow for the auxiliary pressure balancing gas to and from the pressure vessel and a path of flow for liquid refrigerant draining from the pressure vessel.

4. An absorption refrigeration system comprising a plurality of elements interconnected to provide a closed circuit for the circulation of a refrigerant, absorption solution and an auxiliary pressure balancing gas, said system including a main condenser, an auxiliary condenser arranged above the main condenser with one end higher than its opposite end, an evaporator having high and low sections, a conduit connecting the main condenser and low section of the evaporator, a second conduit connecting the main condenser and higher end of the auxiliary condenser, means connected to the evaporator for providing a path of flow for the auxiliary pressure balancing gas therethrough, and a conduit connecting the high section of the evaporator to the lower end of the auxiliary condenser to provide a path of flow for the auxiliary pressure balancing gas to and from the auxiliary condenser and a path of flow for liquid refrigerant draining from the pressure vessel to cause it to flow through the high section of the evaporator.

5. An absorption refrigeration system comprising a plurality of elements interconnected to provide a closed circuit for the circulation of a refrigerant, absorption solution and an auxiliary pressure balancing gas, said system including a condenser, a pressure vessel, an evaporator having a high section constituting a space cooler and a low section constituting a freezing cooler, said sections of the evaporator being connected in series, a conduit connecting the condenser and low freezing section of the evaporator, a second conduit connecting the condenser and pressure vessel, means connected to the evaporator for providing a path of flow for the auxiliary pressure balancing gas therethrough, and a conduit connecting the high space cooler section of the evaporator to the pressure vessel to provide a path of flow for the auxiliary pressure balancing gas to and from the pressure vessel and a path of flow for liquid refrigerant draining from the pressure vessel to cause it to flow through the high space cooler section of the evaporator.

WILHELM GEORG KÖGEL.